Dec. 15, 1925.
C. H. LEINERT
1,566,108
VALVE FOR COMPRESSORS
Filed July 28, 1924    3 Sheets-Sheet 1
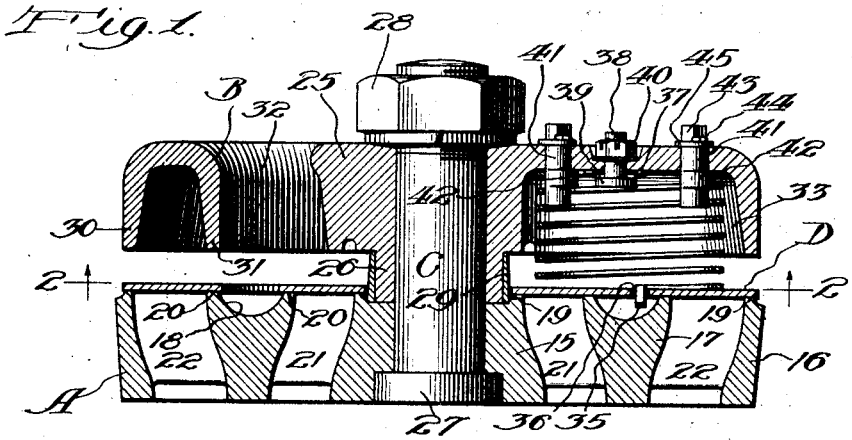
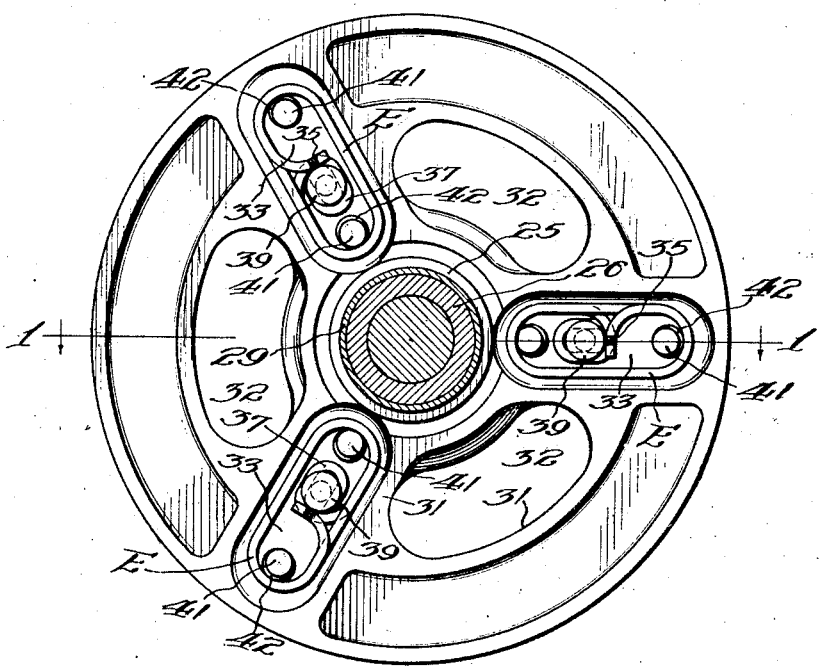
Inventor:
Charles H. Leinert, Dec. 15, 1925.

C. H. LEINERT 1,566,108

VALVE FOR COMPRESSORS

Filed July 28, 1924

Inventor:
Charles H. Leinert,
by
Attys

Dec. 15, 1925.
C. H. LEINERT
VALVE FOR COMPRESSORS
Filed July 28, 1924    3 Sheets-Sheet 3
1,566,108
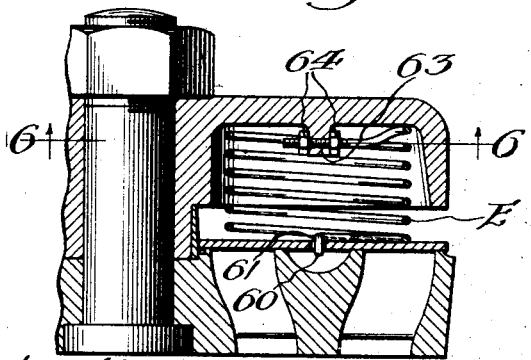
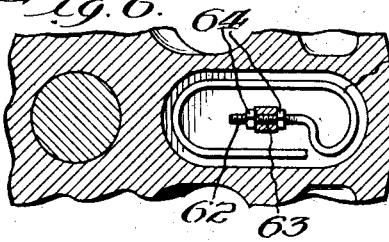
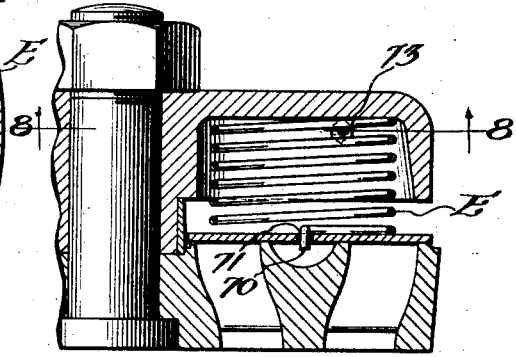
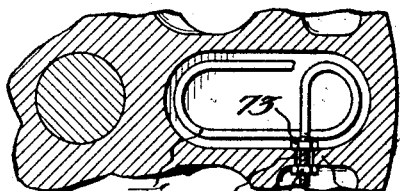
Inventor:
Charles H. Leinert, Patented Dec. 15, 1925.

1,566,108

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE FOR COMPRESSORS.

Application filed July 28, 1924. Serial No. 728,569.

*To all whom it may concern:*

Be it known that I, CHARLES H. LEINERT, a citizen of the United States, residing at Chicago, in the county of Cook and State of Illinois, have invented certain new and useful Improvements in Valves for Compressors, of which the following is a specification.

This invention relates to a valve, either suction or discharge, which is particularly adapted for use in compressors and blowing engines. It is of the general kind shown and described in my Patent No. 1,240,461, but differs therefrom in a number of respects which will hereinafter be pointed out.

In the present invention I have aimed to simplify the assembly of the valve components, particularly the stop plate, the valve disk, and the interposed springs. I further aim to secure the springs in place by means which will permit of their being adjusted radially, rotatively, or otherwise, should this be desired for shifting of the valve disk, or for any other purpose. The springs are furthermore connected with their associated parts in a readily detachable manner, so that substitutions or replacements may be effected conveniently whenever desired.

Various objects, such as the above, are contemplated in the present invention, as are also others which will hereinafter appear. In the description to follow, reference will be made to the accompanying drawings, which exhibit certain preferred embodiments of the invention in the manner following:

Figure 1 is an axial section through a valve assembly taken on line 1—1 of Fig. 2;

Fig. 2 is a transverse section therethrough on line 2—2 of Fig. 1;

Fig. 5 is a fragmentary detail, in axial section, showing a further modification of spring adjusting means;

Fig. 6 is a transverse section taken on line 6—6 of Fig. 5;

Figure 3:
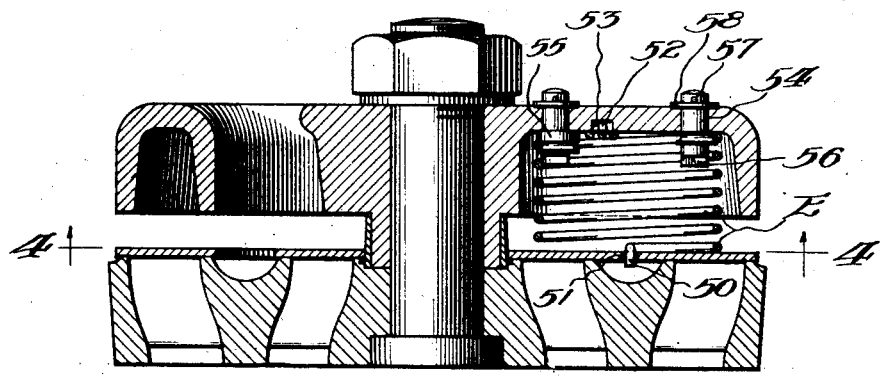
Fig. 3 is a view similar to Fig. 1 taken on line 3—3 of Fig. 4, and shows a valve assembly wherein the springs are adjustably secured by slightly different means.

Fig. 7, which is a fragmentary axial section, shows a still further modification of valve construction, wherein the springs are adjustably secured; and Fig. 8 is a transverse section through the valve of Fig. 7, taken on line 8—8 thereof.

A valve such as this invention is concerned with is particularly suitable for use with blowers of the type which are commonly employed for the discharge of relatively large volumes of air at comparatively low pressure. Such blowers are generally operated at high speed, so that the check valves controlling the inlet and discharge ports for air are also reciprocated at high speed. Owing to conditions such as these, the valves are subjected to hard usage, which results in their frequently wearing out, and a consequent necessity for their renewal or repair. It is accordingly an object of this invention to provide for this kind of service a check valve which is inexpensive, efficient, long-lived, and which may be easily and quickly adjusted, repaired, or renewed, whenever necessary, without shutting down operation of the compressor for any extended period.

Referring now to the several figures of the drawings, I have shown therein certain valves, either suction or discharge, adapted for attachment directly to a compressor wall, or to a cage carried thereby. The valve assembly may include in each instance a seat member A with which is associated a stop plate B detachably connected to the seat as through the medium of a bolt C, the head of which may be countersunk in one of the associated parts, as shown. Interposed between the seat member and the stop plate is a valve D, in the form of a centrally apertured disk, against which a constant pressure is exerted by spring means E, the disk being thereby held normally upon its seat. The parts just enumerated are the principal ones entering into the construction of the present valve, but they are specially formed to cooperate with each other in a peculiar manner, as will now be explained.

The seat member which lies inwardly of the stop plate may be provided with a hub 15, a rim 16, and an intermediate circular wall 17 having an annular groove 18 adjacent to the valve disk. The rim and hub of the seat member may also be provided with annular edges 19 providing a seat for the valve plate, which is adapted to rest there-upon as well as upon the spaced annular edges 20 of the intermediate circular wall 17. Connecting the hub with this wall are a plurality of spokes or webs 21, this wall being further connected to the rim as by means of other spokes or webs 22, the construction being such that between these several spokes are arcuate shaped ports of ample size through which air may pass when the valve plate is lifted from its seat.

The bolt C serves as a convenient means for attaching the stop plate to the seat member, and permits these parts to be readily disconnected whenever desired. I prefer that the stop plate should be provided with a hub 25 having at its inner end an extension 26 which engages with the proximate end of the seat member hub 15, the stop plate being thereby spaced from the seat member at a fixed distance. The bolt C, which passes axially through the seat member and stop plate, is provided at one end with a head 27, and at its other end is threaded to receive a nut 28, whereby the bolt serves as a detachable connecting medium between these parts. Surrounding the hub extension 26 is a bushing 29, which may be slightly tapered, as shown, so as to serve as a means for guiding the disk to its seat.

On its inner side, the stop plate is provided with an inwardly disposed marginal flange 30 and with certain other walls or flanges 31 which depend for substantially equal distances. I further provide through the stop plate a plurality of ports 32, shown as three in number, each port having the form of an arcuate slot which is symmetrically disposed with respect to the valve axis. The walls 31 which define the three slots are configured to define further certain radial channels 33, which alternate in position with the slots. A stop plate of the kind described will accordingly present, on its inner side, a plurality of symmetrically disposed arcuate shaped slots, and intermediately thereof a like number of radially disposed channels having their ends closed by the marginal flange 30 and the hub 25. With a stop plate so constructed, I associate a plurality of springs E equal in number to the radial channels and arcuate slots, each spring being shown as made of wire bent in the form of an elongated loop.

According to the construction of Figs. 1 and 2, one spring end 35 is entered within a recess or opening 36 in the valve disk, so as to be fixed in relation thereto. The opposite spring end 37 terminates in an elongated loop of reduced size, which lies flat against the inner side of the stop plate. The shape of each spring is such as to be received adjustably within one of the radial channels 33 in a manner which permits, under proper conditions, of radial or rotative movements therewithin. The securing of each spring is effected with the aid of a bolt 38 whose shank is entered through the stop plate and through the looped spring extremity 37, the bolt being provided with a head 39 adapted to engage with the inner side of the spring end. To the bolt 38 is applied a nut 40 having a screw threaded connection therewith, and adapted, when tightened, to clamp the spring extremity between the bolt head 39 and the stop plate. Means supplementary to this bolt are also provided for effecting radial or rotative adjustments of each spring, and, as shown in Figs. 1 and 2, this comprises a pair of rotatable pins 41 each formed with an eccentric 42. These two pins are entered through the stop plate on diametrically opposite sides of the bolt 38 and in substantially radial alignment with respect to the valve axis. Each pin eccentric lies within and close to one end of the elongated spring in such a manner as to move the same lengthwise or transversely within the channel when rotated properly for this purpose. A portion of each pin is extended through to the outer side of the stop plate, and terminates in a polygonal formation 43, permitting the application thereto of a suitable tool by which rotation may be conveniently effected. Each pin is securely mounted for rotation within its aperture, as by means of a cotter pin 44 adjacent to a washer 45 which bears against the outer side of the stop plate.

From the description contained in the preceding paragraph, which is particularly concerned with the construction shown in Figs. 1 and 2, it will be apparent that each of the valve springs may be independently adjusted radially or rotatively to the position desired. This is accomplished by first loosening the nut 40 and then rotating the pins 41 as required. Thereafter, the nut 40 is tightened once more, the spring being thereby clamped securely against any further movement. The spring end 35 which engages with the valve disk remains immovable within the opening 36 thereof, whereby the disk may be shifted relative to the valve axis according to the adjustments made in the positions of the several springs.

It thus results that the valve disk is adjustable upon its seat through the medium of the associated springs, such an end being particularly desirable where the valve axis is horizontally disposed.

The preceding description is applicable also to the remaining valve constructions, which are set forth in Figs. 3 to 8 inclusive, in so far as it is concerned with the formation of the seat member, stop plate, connecting bolt, and valve disk. Accordingly, the reference numerals applied to these parts in Figs. 1 and 2 are reproduced at appropriate places in the remaining figures. As the modifications now to be considered are confined to the valve springs and the means whereby they are secured in place, a separate description is necessary for each of the several constructions.

Figure 4:
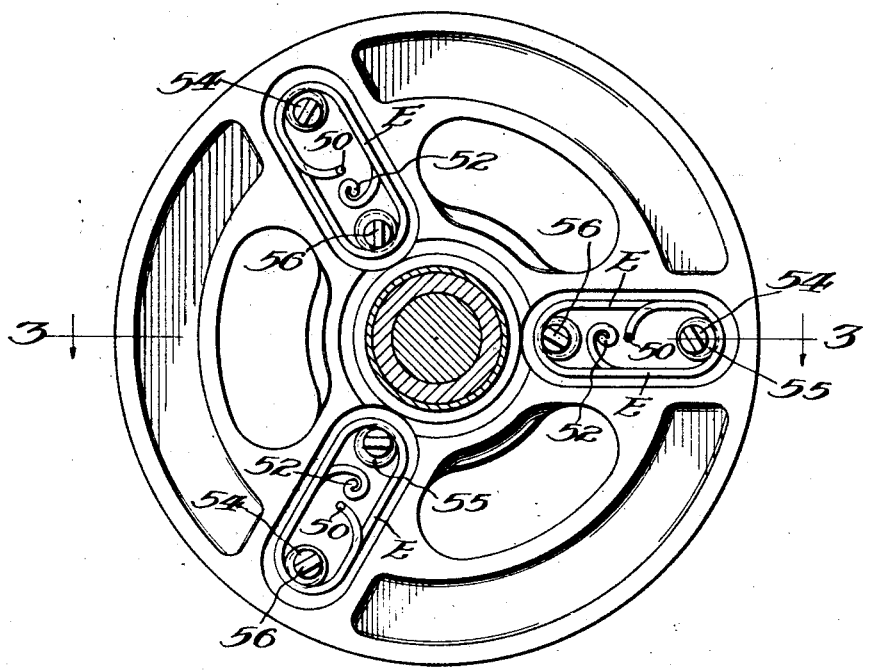
Fig. 4 is a transverse section through the valve of Fig. 3, taken on line 4—4 thereof.

Referring now to Figs. 3 and 4, each of the springs E is shown also to be in the form of an elongated loop having its lower extremity 50 seated within a recess or opening 51 formed in the valve disk. At its opposite end 52, the spring is coiled around in any suitable fashion which will provide an upwardly extending extremity adapted to be slidably received within a recess 53 in the form of a radial slot communicating with the channel 33. Such a spring is freely shiftable radially of the valve. It may be held in any desired position of adjustment, as through the medium of a pair of rotatable pins 54 each having an eccentric 55 which lies within the coils of the spring, one adjacent to each end thereof. These two pins, which are mounted within suitable openings in the stop plate, each presents one end exteriorly thereof. Preferably, the pins are so fitted within their mountings as to be rotatable only with considerable force which may be conveniently applied with the aid of a slotted key (not shown) to the rib 56 at the inner end of the pin, or to a cross pin 57 whose ends bear against a washer 58 which lies upon the outer side of the stop plate. Manifestly, a proper rotation of the two pins will result in a longitudinal or transverse shifting of the spring within the radial channel 33, and its retention in a given position of adjustment therewithin, the opposite spring end exerting a tension of the kind necessary for holding the valve disk upon its seat.

In the remaining figures, Nos. 5 to 8 inclusive, I have deemed it sufficient to show fragmentary views of a valve having, if desired, a construction which is generally similar to the ones heretofore described. Each of these valves may be equipped with a plurality of springs, each alike, one only being illustrated for purposes of exemplification.

Referring now to Figs. 5 and 6, the valve spring E may be in the form of an elongated loop having one end 60 outturned for reception within a recess or opening 61 which is formed in the valve disk. The opposite spring end 62 terminates in a threaded straight portion which is located preferably in a central position relative to the elongated sides of the spring. This threaded spring end is shown as entered through an aperture which is formed in a lug 63 depending from the inner side of the stop plate. A pair of lock nuts 64 are threaded onto the spring end 62, on opposite sides of the lug, for securing the spring in place in any desired position of adjustment longitudinally within the radial channel 33. Obviously, the position of the spring may be changed by proper manipulation of these two nuts.

In the construction of Figs. 7 and 8, I have again shown an elongated spring having one end 70 outturned to enter a recess or opening 71 in the valve disk. The upper spring end, designated as 72, is straightened out to lie transversely of the channel 33, and is formed with threads to receive a pair of nuts 73 which lie upon opposite sides of one of the walls 31 which depend from the inner side of the stop plate. The spring end 72 is entered through a radially disposed slot 74 in this wall, and is capable of adjusting movement therewithin, radially or transversely, as clearly indicated in Fig. 8. By proper manipulation of the two nuts, the spring may be adjusted to any desired position, in a manner which should be entirely obvious.

Throughout the preceding description I have sought to set forth a conventional construction of valve which is characterized by the three usual elements, namely, a seat member, a stop member connected therewith, and an intermediate valve disk having a reciprocable mounting therebetween. As to the exact construction and relationship of these major elements, my present invention is not particularly concerned. Its improvements are directed rather to the spring means which is associated with the stop plate and valve disk to hold the disk yieldingly upon its seat. As hereinbefore suggested, it is possible to modify my invention in several different ways and yet make use of the features which lend novelty thereto. Other modified constructions may readily be arrived at without departing from the principles underlying this invention, and, in so far as the same are defined by the claims following, I would regard them as included within the purview of this patent.

I claim:

1. In a valve of the kind described, the combination of a seat, a stop plate associated therewith, a disk positioned for reciprocation between the seat and stop plate, and a plurality of springs interposed between the disk and the stop plate, each having capacity for radial adjustment, and means whereby to secure each spring against movement, substantially as described.

2. In a valve of the kind described, the combination of a seat, a stop plate associated therewith, a disk positioned for reciprocation between the seat and stop plate, and a plurality of springs interposed between the disk and the stop plate, each having capacity for radial and transverse adjustment, and means whereby to secure each spring against movement, substantially as described.

3. In a valve of the kind described, the combination of a seat, a stop plate associated therewith, a disk positioned for reciprocation between the seat and stop plate, a plurality of springs interposed between the disk and stop plate, and means whereby each spring may be adjustably secured to the stop plate, substantially as described.

4. In a valve of the kind described, the combination of a seat, a stop plate associated therewith, a disk positioned for reciprocation between the seat and stop plate, a plurality of springs interposed between the disk and stop plate having a fixed engagement with the former, and means for adjustably securing to the stop plate each spring in a manner which communicates a shifting movement to the disk, substantially as described.

5. In a valve of the kind described, the combination of a seat, a stop plate associated therewith, a disk positioned for reciprocation between the seat and stop plate, means for guiding the disk to a central position upon the seat, and a plurality of springs interposed between the disk and stop plate adapted to urge the former toward the seat, there being a fixed connection between each spring and the disk, and means for adjustably securing each spring to the stop plate, substantially as described.

6. In a valve of the kind described, the combination of a seat, a stop plate associated therewith, a disk positioned for reciprocation between the seat and stop plate, a coiled spring interposed between the disk and stop plate, and movable means in engagement with opposite sides of the spring adapted to shift the latter toward and from the valve axis, substantially as described.

7. In a valve of the kind described, the combination of a seat, a stop plate associated therewith, a disk positioned for reciprocation between the seat and stop plate, a plurality of springs interposed between the disk and stop plate, each spring being coiled in the form of an elongated loop having one end adjustably secured to the stop plate, and means carried by the stop plate in engagement with opposite ends of the spring loop adapted to shift the springs radially of the valve, substantially as described.

8. In a valve of the kind described, the combination of a seat, a stop plate associated therewith, a disk positioned for reciprocation between the seat and stop plate, a plurality of springs interposed between the disk and stop plate, each spring being coiled in the form of an elongated loop having one end adjustably secured to the stop plate and its other end fixedly secured to the disk, and means carried by the stop plate in engagement with opposite ends of the spring loop adapted to shift the springs radially or transversely of the valve whereby the disk is similarly shifted, substantially as described.

9. In a valve of the kind described, the combination of a seat, a stop plate associated therewith, a disk reciprocably positioned between the seat and stop plate, and a plurality of springs interposed between the disk and stop plate, each spring having one end fixedly engaged with the disk, and its opposite end adjustably secured to the stop plate, there being means for shifting each spring radially with respect to the stop plate, substantially as described.

10. In a valve of the kind described, the combination of a seat, a disk, a plurality of springs, and a stop plate, assembled in the order named, and means operable from the outer stop plate side adapted to shift the positions of the springs on the opposite side thereof, substantially as described.

11. In a valve of the kind described, the combination of a stop plate, a plurality of springs, and a valve disk, assembled in the order named, there being an adjustable connection between each spring and the stop plate, and a fixed connection between each spring and the valve disk, a seat toward which the disk is urged by the springs, means for guiding the disk to its seat, and means for shifting the disk relative to its seat, comprising adjusting devices, one for each spring, carried by the stop plate and adapted to move each spring in a direction either radially or transversely of the valve axis, substantially as described.

CHARLES H. LEINERT.